Patented Oct. 27, 1942

2,300,126

UNITED STATES PATENT OFFICE 2,300,126

CONDENSATION PRODUCT OF NAPHTHENIC ACID HALIDE AND PROCESS OF MAKING IT

Eugene Lieber, Staten Island, N. Y., assignor to Standard Oil Development Company, a corporation of Delaware No Drawing. Original application October 29, 1938, Serial No. 237,742. Divided and this application December 27, 1940, Serial No. 371,994

9 Claims. (Cl. 260—586)

The present invention relates to the art of producing lubricants, and more specifically to lubricating oils of low pour point, by the addition of pour depressants or wax modifying agents to waxy oils, and also to processes for producing such depressants or modifiers.

Wax modifying agents are made by condensation or polymerization of various materials, but exhaustive studies have shown that a great many polymers or condensation agents do not have these valuable properties. Most modifying agents are prepared from waxy hydrocarbons or materials which have a wax-like structure attributable to a relatively long hydrocarbon chain. It has now been discovered that valuable depressants or modifiers can be prepared from cheaper sources of materials and specifically from naphthenic acids which occur naturally in certain crude oils, notably those obtained from the Gulf Coast of the U. S., certain portions of California, Rumania, Venezuela and elsewhere.

This new type of depressants, as stated above, is produced from naphthenic acids. Such acids are separated from the crude oil or fractions wherein they occur by known methods and they may be purified to whatever degree appears to be desirable. Such processes, being no part of the present invention, need not be described in detail. In the present process, the naphthenic acids are first converted into acid halides, preferably chlorides, by treatment with phosphorus chloride or the equivalent halides of the metalloids, for example, thionyl chloride. The reaction progresses smoothly at the temperature of boiling water and the acid halide forms a layer which may be readily decanted.

The naphthenyl halides are then polymerized or condensed to produce the wax modifiers. The reaction may be effected by thermal means alone at temperatures from about 400° to 750° F., care being taken to avoid carbonization by too high or too rapid heating or by heating which is not uniform. It is desirable to thoroughly stir the polymerization product during reaction, preferably by passing a current of nitrogen or other inert gas through the reaction mixture so as not only to cause agitation, but likewise to remove hydrogen chloride vapors which are evolved during the reaction. The heating is continued for several hours until the evolution of hydrogen chloride has practically ceased. The product thickens during the heating and it is desirable to conduct the reaction under a reflux condenser so as to permit the escape of the acid vapors and to return liquid materials for further reaction. Polymerization may be continued for some time after the acid evolution has practically ceased, but too long a heating is undesirable as solids are apt to be formed.

If desired, polymerization may be effected by the aid of catalysts, particularly aluminum chloride or its equivalents among the group of Friedel-Crafts or active halide catalysts. The conditions of reaction are substantially the same as given above; a temperature of at least about 400° is required, but it is preferable not to conduct the heating above about 500° F., in the presence of these active catalysts. The time of reaction is about the same as given above and the results are substantially the same.

After polymerization has been effected, the product is preferably diluted with kerosene or a similar solvent and the solution is washed with aqueous alcohol to remove the remainder of the acid. If catalyst is used, its hydrolysis is accomplished by the addition of the aqueous alcohol and the catalytic sludge separates from the solid layer so that it is readily removed in this way.

The kerosene or other solution is then distilled, preferably with fire and steam, up to about 500° or 600° F., in order to remove the kerosene and the lower boiling fractions of the polymer.

The product recovered as a distillation residue is thick, viscous and gummy, usually of a dark green to brownish color, and is freely soluble in mineral oils. It may be further purified by sulfuric acid treatment, but if it has been carefully prepared, it is suitable for use as such.

As a pour point depressant, the material is added to the oil in proportion from about .1 to 5%. It will be understood that like other depressants, the potency of the material depends to some extent on the particular samples of naphthenic acids available, and likewise the different oils show different susceptibility to the action of these depressants. As wax modifying agents, the materials are used in substantially the same amounts and are added to the waxy oil either before or after it is diluted with the wax separating solvents. The actual separation of wax is made by sedimentation, centrifugation or filtration, and it is greatly assisted by the presence of these modifying agents.

*Example 1*

Eighty-eight grams of refined naphthenic acids from Columbian crude oil were converted to the naphthenyl chloride by heating with one molecular proportion of thionyl chloride. When evolution of sulfur dioxide and hydrogen chloride had ceased, the naphthenyl chloride was transferred to a suitable reactor fitted with a thermometer and outlet tube for HCl gas. 10 grams of anhydrous AlCl3 were added all at once and the mixture slowly heated to 450° F. and maintained thereat for 5 hours, at which time the evolution of HCl had practically ceased. The mixture was cooled and taken up in 600 cc. of kerosene and washed with an alcohol-water mixture. After settling, the kerosene extract was distilled with fire and steam to 600° F. to remove low boiling material. A residue of 54 grams of a dark green viscous oil was obtained. This is a yield of 61 percent based on the naphthenic acids. The pour depressor potency was tested by blending in a waxy-oil. The following results were obtained:

|  | Pour point, °F. |
|---|---|
| Original oil | +30 |
| Original oil+1% polymerized Co. napht. acids | 0 |
| Original oil+5% polymerized Co. napht. acids | −20 (better than) |

*Example 2*

The procedure and quantities of Example 1 were repeated exactly except that the polymerization was carried out in the absence of catalyst. Example 2 comprises two individual cases. In the first, the reaction was carried out at 400° F. for 5 hours, while in the second the reaction temperature was maintained at 480° F. for 5 hours. The recovery of the products was the same as described previously. The following table gives the results obtained:

| Reaction temp. °F. | Yield | A. S. T. M. potency | |
|---|---|---|---|
|  |  | Added | Pour point |
|  | Per cent | Per cent | °F. |
| 400 | 52 | 5 | −5 |
| 480 | 60 | 5 | −5 |
| Blank |  |  | +30 |

*Example 3*

125 grams of naphthenic acids obtained from Venezuelan crude oil were converted to the naphthenyl chloride as described in Example 1. The resulting naphthenyl chloride was placed in a suitable reactor fitted with a return condenser, thermometer and inlet tube for inert gas (nitrogen). 15 grams of anhydrous AlCl3 were added as quickly as possible. A rapid stream of inert gas was passed through the mixture and the temperature raised to 450° F. and maintained thereat for 5 hours, at which time the evolution of HCl had practically ceased. After cooling the product was recovered as described in Example 1. A yield of 67% based on the naphthenic acids was obtained. The pour depressor potency was obtained by blending in a waxy-oil. The following result was obtained:

|  | Pour point, °F. |
|---|---|
| Original oil | +30 |
| Original oil+5% polymerized naph. acids | −20 (better than) |

*Example 4*

The procedure and quantities of naphthenic acids and AlCl3 of Example 3 were repeated exactly except that the mixture was not agitated with nitrogen gas. The recovery of product was the same as before. A yield of only 32% based on the naphthenic acids was obtained. When blended to the same concentration (5%) as in Example 3, the pour point of the waxy-oil was −10° F.

This application is a division of co-pending application Serial No. 237,742, filed October 29, 1938, Patent No. 2,246,312.

The present invention is not to be limited by any theory of the mechanism of the reaction nor to naphthenic acids of any particular source nor to any catalyst, but only to the following claims in which it is desired to claim all novelty inherent in the invention.

I claim:

1. A polymer obtained by condensation of naphthenic acid halide.

2. A polymer obtained by condensation of naphthenic acid chloride.

3. An improved process for preparing wax modifying agents comprising polymerization of naphthenic acid halides at temperatures within the range of 400° to 700° F.

4. An improved process for producing wax modifying agents comprising the condensation of naphthenic acid halides at temperatures between 400° and 700° F., during a prolonged period until evolution of acid vapors substantially ceases.

5. Process according to claim 4 in which the process is non-catalytic.

6. Process according to claim 4 in which the process is effected in the presence of a Friedel-Crafts catalyst at a temperature between about 400° and 500° F.

7. An improved process for producing wax modifying agents comprising condensing naphthenic acid chloride by means of aluminum chloride at a temperature from about 400° to 500° F., during a prolonged reaction period, then hydrolyzing the catalyst and removing the products of the catalyst hydrolysis, distilling off the low boiling products and recovering the distillation residue.

8. Process according to claim 7 in which the current of inert gas is passed through the reaction mixture during the polymerization.

9. A product consisting essentially of a viscous oil soluble in mineral oils, substantially non-volatile at temperatures up to about 500° F. under fire and steam distillation, and having wax-modifying properties, said product being derived by Friedel-Crafts auto-condensation of a naphthenic acid chloride.

EUGENE LIEBER.